(12) United States Patent
Luo et al.

(10) Patent No.: US 7,895,457 B2
(45) Date of Patent: Feb. 22, 2011

(54) MEMORY CARD WITH POWER SAVING

(75) Inventors: Jianjun Luo, Sunnyvale, CA (US);
David Queichang Chow, San Jose, CA (US)

(73) Assignee: SuperTalent Electronics, Inc., San Jose, CA (US)

( * ) Notice: Subject to any disclaimer, the term of this patent is extended or adjusted under 35 U.S.C. 154(b) by 776 days.

(21) Appl. No.: 11/841,550

(22) Filed: Aug. 20, 2007

(65) Prior Publication Data
US 2009/0055667 A1 Feb. 26, 2009

(51) Int. Cl.
*G06F 1/00* (2006.01)
*G06F 1/32* (2006.01)
*G06F 12/00* (2006.01)

(52) U.S. Cl. .................. 713/322; 713/320; 711/115
(58) Field of Classification Search .................. 713/322
See application file for complete search history.

(56) References Cited

U.S. PATENT DOCUMENTS

| | | | | |
|---|---|---|---|---|
| 5,247,164 A | * | 9/1993 | Takahashi | 235/492 |
| 5,406,064 A | * | 4/1995 | Takahashi | 235/492 |
| 6,407,940 B1 | * | 6/2002 | Aizawa | 365/52 |
| 6,633,956 B1 | * | 10/2003 | Mitani | 711/115 |
| 7,286,435 B2 | * | 10/2007 | Odate et al. | 365/227 |
| RE40,147 E | * | 3/2008 | Aizawa | 365/52 |
| 7,407,393 B2 | | 8/2008 | Ni et al. | |
| 7,420,803 B2 | | 9/2008 | Hsueh et al. | |
| 2008/0000989 A1 | * | 1/2008 | Chen et al. | 235/492 |

FOREIGN PATENT DOCUMENTS

JP  09292939 A * 11/1997

* cited by examiner

*Primary Examiner*—Suresh K Suryawanshi
(74) *Attorney, Agent, or Firm*—Maryam Imam; IPxLaw Group LLP

(57) ABSTRACT

A memory system includes power saving arbitrator responsive to a clock oscillator and having a first clock rate. The power saving arbitrator includes an active enable circuit responsive to a host clock and a host command and operative to generate an active enable signal for causing the power saving arbitrator to generate a core logic/memories signal having a second clock rate that is adjustably lower in rate than the first clock rate, said active enable circuit operative to detect the absence of a host command for a predetermined period of time and when the predetermined period of time exceeds a threshold value, the power saving arbitrator operative to reduce the second clock rate.

12 Claims, 3 Drawing Sheets

MEMORY CARD WITH POWER SAVING

BACKGROUND OF THE INVENTION

1. Field of the Invention

This invention relates to the field of memory cards (or devices) and particularly to power savings method and apparatus employed in the memory cards.

2. Description of the Prior Art

Solid state memory or non-volatile memory, in the form of flash, is readily employed in numerous applications requiring saving and retrieving digital information. Some use thereof includes memory sticks, disk drives, personal digital assistants (PDAs) and other digital mobile devices.

Memory cards (or devices), removably coupled to a host device, include non-volatile or flash memory for storing digital information used in various applications, such as photography, video games, and numerous others. Generally, a controller device is used in the memory card to cause communication between the host and the memory included in the memory card. The host writes digital information to be captured in the memory card under the direction of the controller device. Similarly, the host reads the stored information from the memory card under the control of the controller device.

Conservation of power is of particular importance because when the memory card is coupled to the host, power consumed thereby affects power consumption of the host. In applications where the host is a part of a portable unit or device, such as a laptop or handheld device, it is vital to try to reduce power consumption as much as possible.

There is therefore a need for a memory card with reduced power consumption.

SUMMARY OF THE INVENTION

Briefly, an embodiment of the present invention includes a memory system includes power saving arbitrator responsive to a clock oscillator and having a first clock rate. The power saving arbitrator includes an active enable circuit responsive to a host clock and a host command and operative to generate an active enable signal for causing the power saving arbitrator to generate a core logic/memories signal having a second clock rate that is adjustably lower in rate than the first clock rate, said active enable circuit operative to detect the absence of a host command for a predetermined period of time and when the predetermined period of time exceeds a threshold value, the power saving arbitrator operative to reduce the second clock rate.

The foregoing and other objects, features and advantages of the invention will be apparent from the following detailed description of the preferred embodiments which made reference to the several figures of the drawing.

IN THE DRAWING

DETAILED DESCRIPTION OF THE PREFERRED EMBODIMENTS

In an embodiment of the present invention, a controller with power saving module 18 includes a power saving method and apparatus that provides a memory card with a power saving strategy. When an external host does not send any commands for a predetermined period of time, the controller with power saving module 18 goes into a stand-by mode, at which time the controller with power saving module 18 shuts down the main (or system) clock so that the memory card 14 operates at an inactive state. When the external host sends commands again, the controller with power saving module 18 is awakens itself and exits the stand-by mode. The memory card 14 is operative to save power by entering the idle (or inactive or stand-by) state.

Figure 1:
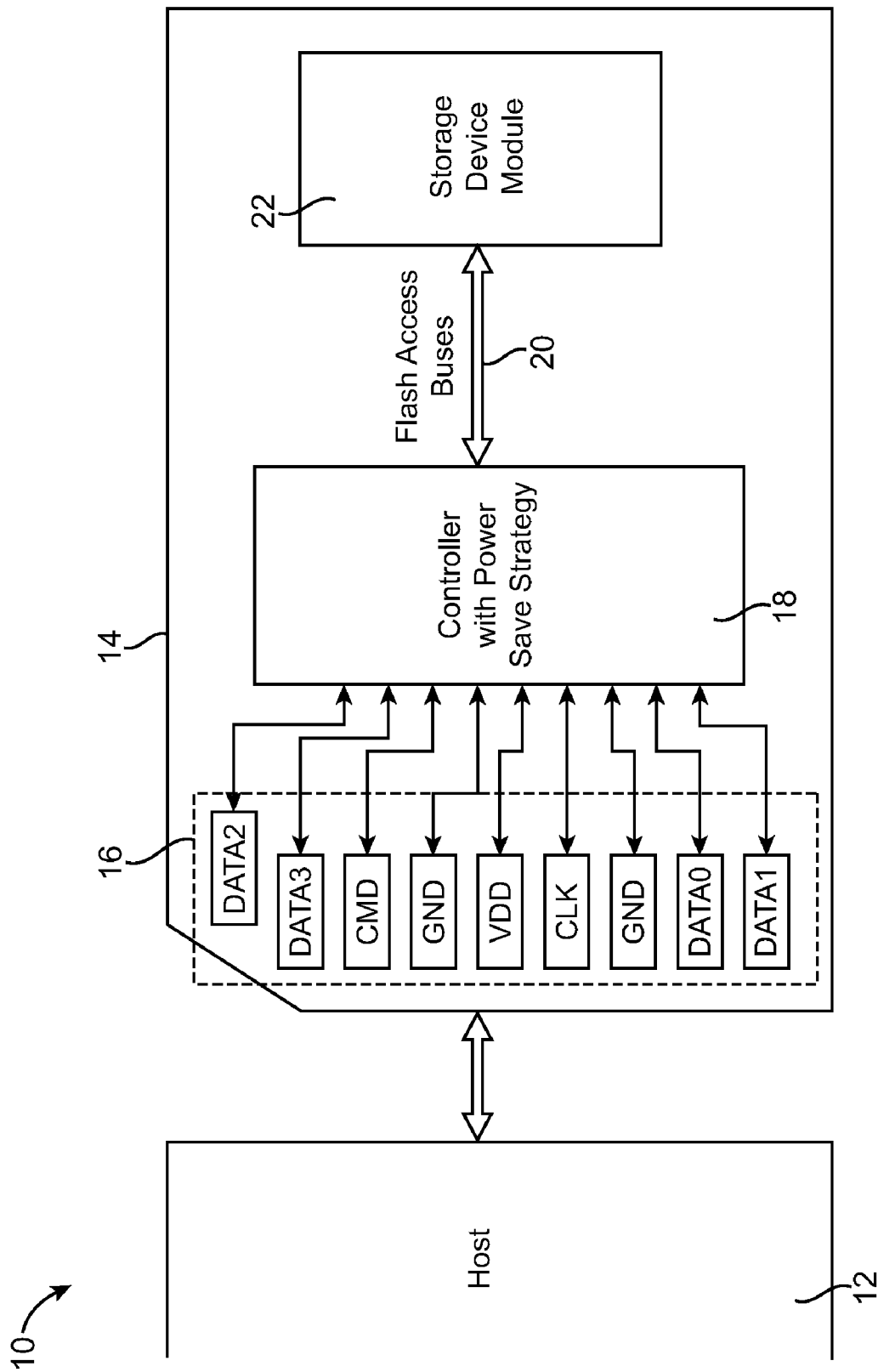
FIG. 1 shows a memory system 10 is shown to include a host 12 and a memory card (or device) 14 coupled to communicate with each other.

Referring now to FIG. 1, a memory system 10 is shown to include a host 12 and a memory card (or device) 14 coupled to communicate with each other. The memory cared 14 is shown to include a card interface 16, a controller with power saving module 18 and a storage device module 22, in accordance with an embodiment of the present invention. The host 12 is generally located externally to the memory card 14.

The card interface 16 is shown to include various data, command, clock and other information/signals transferred between the host 12 and the controller with power saving module 18. In this manner, the controller with power saving module 18 interfaces between the host 12 and the storage device module 22 causing communication under its control and therebetween. Such communication includes commands, data, or other type of information transferred to the storage device module 22. Some of the information in the card interface 16 is not transferred to the storage device module 22. The controller with power saving module 18 and the storage device module 22 communication through the flash access buses 20, which are a collection of signals.

The controller with power saving module 18 includes power saving arbitrator operative to detect a mode in which the host is operating and then to adjust the rate of the clock accordingly thereby reducing power consumption. For example, when a video stream is playing on a laptop, the host need not operate as fast as some other applications, therefore, the host clock may be divided to oscillate at a lower rate thereby saving power. The same holds true in an application where reading and/or writing to the storage device module 22 is taking place.

In one embodiment of the present invention, the storage device module 22 includes non-volatile memory, such as flash memory. Various examples of flash are NAND or NOR type of flash memory or EEPROM or EPROM type of memory.

Figure 2:
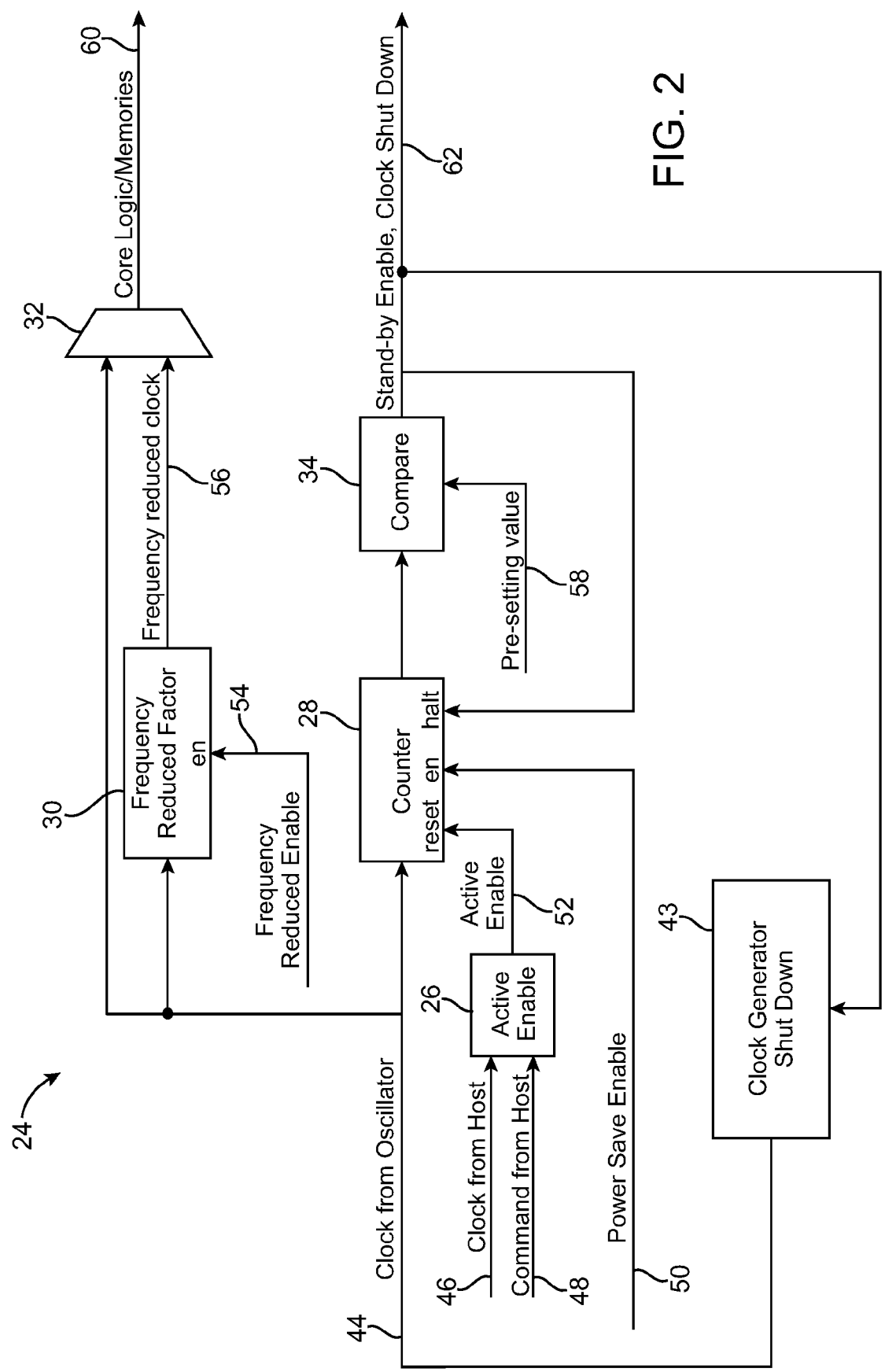
FIG. 2 shows further details of the controller with power saving module 18, in accordance with an embodiment of the present invention.

FIG. 2 shows further details of the controller with power saving module 18, in accordance with an embodiment of the present invention. The controller with power saving module 18 includes a power saving arbitrator 24, which is shown to include active enable circuit 26, host command counter 28, frequency reducing factor circuit 30, clock selection circuit 32 and a clock generator 43, in accordance with an embodiment of the present invention.

The active enable circuit 26 is shown to receive a host clock 46 and a host command 48 from the host 12 and is operative to generate an active enable signal 52. The host command counter 28 is shown coupled to the active enable circuit 26 through the signal 52. That is, the host command counter 28 receives the signal 52 from the active enable circuit 26. The host command counter 28 is shown to be driven by an oscillator clock 44, which serves as an input to the counter 28. The clock 44 is generated by the clock generator 43, which may be an oscillator generally used in circuit design. The clock generator 43 is controlled by the signal 62 in that it is shut-down or turns on by the signal 62. The signal 62 serves as input to the clock generator 43. The counter 28 receives an output generated by the clock generator 43, this output is the same as the clock 44.

The host command counter 28 is further shown to receive power save enable signal 50 and stand-by enable signal 62. The output of the threshold comparator 34 is shown to couple the threshold comparator 34 to the threshold comparator 34. The threshold comparator 34 is shown to receive as another input, threshold value 58 and is operative to generate stand-by enable signal 62, which is used to control the clock generator 43 to turn it on or shut it down.

The frequency reducing factor circuit 30 is shown to receive, as input, the oscillator clock 44 and a frequency reducing enable signal 54 and is operative to generate frequency reduced clock 56 for coupling to the clock selection circuit 32. The clock selection circuit 32 is shown to receive oscillator clock 44 in addition to the frequency reduced clock 56 and operative to generate core logic/memories signal 60.

The oscillator clock 44, host clock 46, host command 48 and power save enable signal 50 are generally included in the card interface 16 of FIG. 1.

The memory card 14 includes the power saving arbitrator 24 serving to provide the memory card 14 with a power saving strategy. When the external host 12 does not send any commands for a predetermined period of time, the controller with power saving module 18 goes into a stand-by mode, at which time the controller with power saving module 18 shuts down the main (or system) clock so that the memory card 14 operates at an inactive state. When the external host 12 sends commands again, the controller with power saving module 18 is awakens itself and exits the stand-by mode. The memory card 14 is operative to save power by entering the idle (or inactive or stand-by) state.

In operation, the active enable circuit 26 is used to synchronize the host commands received from the host, i.e. host command 48, with the host clock 46. The host command counter 28 serves to count the time during which no commands are received from the host (this time is host command inactive period) based on clock cycles when power savings mode is enabled. That is, the counter 28 counts time, based on clock cycles, or each clock cycle of the clock 46, during which no command is provided by the host. When a command from the host is detected, the counter 28 is reset.

The threshold comparator 34 operates to compare the host command count, generated by the host command counter 28, to a threshold value, coupled to the threshold value 58 so that if the number of the counter 28, which is the host command inactive period, is equal to or exceeds the threshold value, the system clock rate remains that of its typical rate whereas, if the host command in-active period, as counted by the clock cycles of the clock 46 falls below the threshold value, the clock generator 46 is shut down or exhibits no rate, in which case, a stand-by mode is enabled. Alternatively, the number of received host commands being equal to or less than the threshold value triggers the clock shut down.

The frequency reducing factor circuit 30 operates to divide the rate of the oscillator clock 44, which is referred to as the system clock and the clock selection circuit 32 operates to select between the oscillator clock 44 and a divided version thereof, as coupled onto the frequency reduced clock 56.

The signal 50 causes the host command counter 28 to activate, or not, the power saving mode and the stand-by enable signal 62 causes the host command counter 28 to halt or stop counting when in stand-by mode.

The frequency reducing enable signal 54 is used activate reducing of the system clock to a rate other than the normal operation rate. This is done to accommodate modes. For example, in the stand-by mode, the rate of the system clock may be very low or zero, the frequency reduced clock 56 accordingly reflects this rate and is selected by the clock selection circuit 32 to be the clock rate used by core logic or memories in the system 10, as reflected by core logic/memories signal 60. Modes other than stand-by that have the affect of using lower rate clock are also supported by the frequency reducing enable signal 54 by having the oscillator clock 44 divided down to a lower rate. The oscillator clock 44 serves as the clock rate to be divided to attain different rate frequencies by the frequency reducing factor circuit 30.

While in stand-by mode, if commands are received from the host 12, through the host command 48, the active enable circuit 26 causes the active enable signal 52 to recognize the same to reset the host command counter 28 so that the system clock can be increased back to its normal operational rate, or full speed.

The power save enable signal 50 and active enable signal 52 are asynchronous so that the latter resets the host command counter 28 even if the power save enable signal 50 is active. If the power save enable signal 50 is not active, as done by the external host 12, the host command counter 28 automatically adds one to the counter's count every system clock cycle. System (or main) clock, as used herein, refers to the oscillator clock 44.

Figure 3:
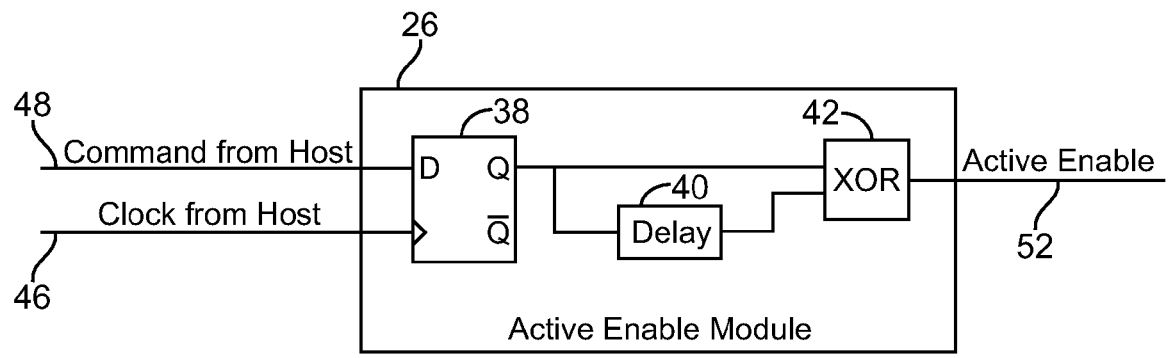
FIG. 3 shows further details of the active enable circuit 26.

FIG. 3 shows further details of the active enable circuit 26. In FIG. 3, the active enable circuit 26 is shown to include an active enable register 38, a active enable delay 40 and a active enable comparator circuit 42. In one embodiment of the present invention, the active enable register 38 is a D flip flop whose output toggles whenever its input transitions to a state of binary '1' or '0', as clocked by its clock input. Other types of registers are anticipated.

In FIG. 3, the active enable register 38 is shown to receive the host command 48 at its D input and the host clock 46 as its clock input. The active enable register 38 is shown to generate an output that causes the active enable register 38 to be coupled to the active enable delay 40. The output of the active enable register 38 is also provided as input to the active enable comparator circuit 42. The active enable comparator circuit 42 generates the signal 52. The net effect of the active enable circuit 26 is to detect a state of '1' (to detect a state transition, either from '1' to '0' or from '0' to '1') on the host command 48, as clocked by the host clock 46 and then to delay the same and compare it to a non-delayed version of the same, when an overlap of matching states of the delayed version and the non-delayed version of the output the active enable register 38 is detected by the active enable comparator circuit 42, the signal 52 is activated. This is perhaps best understood with reference to FIG. 4.

Delay time is a design choice and in various examples, it is 5 ns or 10 ns (for example, it can be 5 ns. But a designer can change this value based on the whole circuit's parameters). This delay is actually the pulse width of signal 52. The pulse width or the delay parameter should be wide enough to drive the connected circuit with the correct logic actions. The circuit 26 is an edge-detecting circuit of the signal from the register 38's output (or Q-port). When the register 38's output toggles, the signal 52 generates a pulse.

Figure 4:
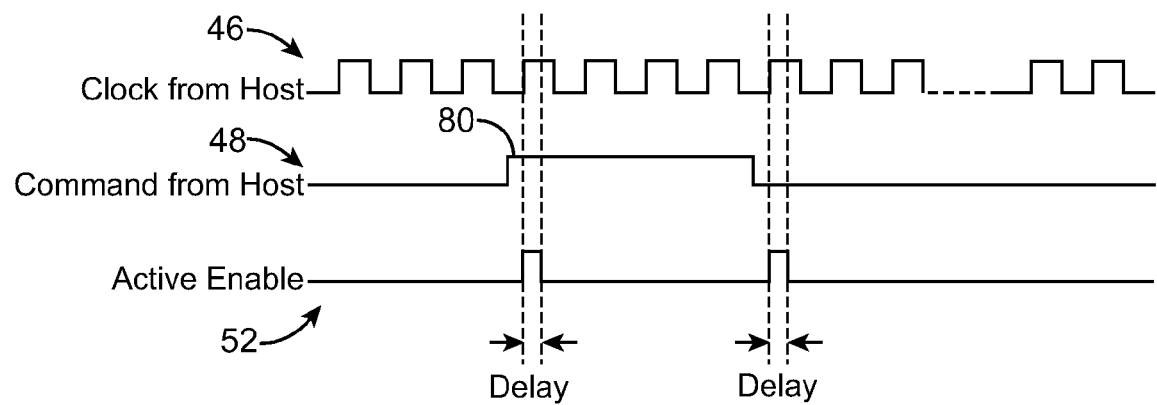
FIG. 4 shows a timing diagram of the relevant signals of the FIG. 3.

FIG. 4 shows a timing diagram of the relevant signals of the FIG. 3. In FIG. 4, the host clock 46 is shown to be used by the active enable register 38 to clock or synchronize the host command 48. More specifically, when the host command 48 transitions to a '1' state and clocked in, at 80, the output of the active enable register 38 goes to a high state, or '1', and then this output and a delay version thereof, generate the active enable signal 52.

When clock 46's rising edge arrives, the register 38's output (Q port) will change to QX and directly go to the circuit 42's input port. And the circuit 42's another input, which is the output of the delay 40 keeps the state of the register 38's Q for a predetermined number of seconds, such as n. This means XOR will execute Q^QX. So, then Q toggles (no matter from "1 to 0" or "0 to 1"), XOR's output will be a pulse width defined by the delay time.

In accordance with the foregoing, power consumption is reduced due to altering the rate of the clock used by the system 10 as a result of detection of various modes. When used in a memory card, the power saving arbitrator 24 causes the system 10 to improve use of power thereby extending battery power. One exemplary improvement is realized when a user of the system 10 is viewing video, which would cause the clock rate to be reduced as it is unnecessary to run at fast rates. Another exemplary improvement is when the system 10 is performing read/write operations to memory, in which case, the clock rate is also reduced.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A memory system comprising:
   power saving arbitrator responsive to an oscillator clock having a first clock rate, said power saving arbitrator includes,
   an active enable circuit responsive to a host clock and a host command and operative to generate an active enable signal for causing the power saving arbitrator to generate a core logic/memories signal having a second clock rate that is adjustably lower in rate than the first clock rate, said active enable circuit operative to detect the absence of a host command for a predetermined period of time and when the predetermined period of time exceeds a threshold value, the power saving arbitrator operative to reduce the second clock rate;
   a host command counter responsive to the oscillator clock and the active enable signal and operative to generate an output reflective of the number of oscillator clock cycles during which a host command has not been detected; and
   a threshold comparator responsive to the counter output and further responsive to a threshold value and operative to compare the threshold value and the counter output to determine whether or not the predetermined period of time exceeds the threshold value and to generate a stand-by enable signal reflecting the same.

2. A memory system, as recited in claim 1, further including a frequency reducing factor circuit responsive to the oscillator clock and a frequency reducing enable signal and operative to generate a frequency reduced clock, wherein upon the detection of activation of the frequency reducing enable signal, the frequency reducing factor circuit causes the first clock rate to be divided to be the second clock rate taken on by the frequency reduced clock.

3. A memory system, as recited in claim 2, further including a clock selection circuit responsive to the frequency reduced clock and the oscillator clock and operative to select between the clock selection circuit and the oscillator clock to generate the core logic/memories signal.

4. A memory system, as recited in claim 3, wherein the active enable circuit further includes a active enable register, a active enable delay and a active enable comparator circuit, the active enable register responsive to the host command and the host clock and operative to generate a register output to couple the active enable register to the active enable delay, the active enable delay operative to delay the register output, the active enable comparator circuit responsive to the register output and the delay register output and operative to compare the same to generate the active enable signal, the active enable signal reflective of an active state upon a match between the states of the register output and the delay register output, to generate.

5. A memory system, as recited in claim 4, wherein the active enable circuit is further operative to cause the host command counter to reset upon detecting host commands on the host command.

6. A power saving arbitrator, as recited in claim 5, further including a clock generator responsive to the stand-by enable signal and operative to generate the oscillator clock.

7. A power saving arbitrator comprising:
   An active enable circuit responsive to a host clock and a host command, the power saving arbitrator responsive to an oscillator clock having a first clock rate, the power saving arbitrator operative to generate an active enable signal for causing the power saving arbitrator to generate a core logic/memories signal having a second clock rate that is adjustably lower in rate than the first clock rate, said active enable circuit operative to detect the absence of a host command for a predetermined period of time and when the predetermined period of time exceeds a threshold value, the power saving arbitrator operative to reduce the second clock rate;
   a host command counter responsive to the oscillator clock and the active enable signal and operative to generate an output reflective of the number of oscillator clock cycles during which a host command has not been detected; and
   a threshold comparator responsive to the counter output and further responsive to a threshold value and operative to compare the threshold value and the counter output to determine whether or not the predetermined period of time exceeds the threshold value and to generate a stand-by enable signal reflecting the same.

8. A power saving arbitrator, as recited in claim 7, further including a frequency reducing factor circuit responsive to the oscillator clock and a frequency reducing enable signal and operative to generate a frequency reduced clock, wherein upon the detection of activation of the frequency reducing enable signal, the frequency reducing factor circuit causes the first clock rate to be divided to be the second clock rate taken on by the frequency reduced clock.

9. A power saving arbitrator, as recited in claim 8, further including a clock selection circuit responsive to the frequency reduced clock and the oscillator clock and operative to select between the clock selection circuit and the oscillator clock to generate the core logic/memories signal.

10. A power saving arbitrator, as recited in claim 9, wherein the active enable circuit further includes a active enable register, a active enable delay and a active enable comparator circuit, the active enable register responsive to the host command and the host clock and operative to generate a register output to couple the active enable register to the active enable delay, the active enable delay operative to delay the register output, the active enable comparator circuit responsive to the register output and the delay register output and operative to compare the same to generate the active enable signal, the active enable signal reflective of an active state upon a match between the states of the register output and the delay register output, to generate.

11. A power saving arbitrator, as recited in claim 10, wherein the active enable circuit is further operative to cause the host command counter to reset upon detecting host commands on the host command.

12. A method of saving power consumed by a memory card comprising:
- receiving an oscillator clock having a first clock rate;
- receiving a host clock;
- receiving a host command;
- generating an active enable signal based on the received host clock and host command, the active enable signal indicative of the absence of a host command for a predetermined period of time;
- generating an output reflective of the number of oscillator clock cycles during which a host command has not been detected;
- receiving a counter output and a threshold value;
- comparing the threshold value and the counter output to determine whether or not the predetermined period of time exceeds the threshold value and to generate a standby enable signal reflecting the same.

* * * * *